United States Patent
Outwater et al.

(10) Patent No.: US 10,000,128 B2
(45) Date of Patent: Jun. 19, 2018

(54) METHOD AND APPARATUS FOR PARKING LOT METERING USING ACTIVATION CODES

(75) Inventors: Chris Outwater, Santa Barbara, CA (US); William Gibbens Redmann, Glendale, CA (US)

(73) Assignee: Liberty PlugIns, Inc., Santa Barbara, CA (US)

( * ) Notice: Subject to any disclaimer, the term of this patent is extended or adjusted under 35 U.S.C. 154(b) by 311 days.

(21) Appl. No.: 13/582,470

(22) PCT Filed: Mar. 11, 2011

(86) PCT No.: PCT/US2011/028012
§ 371 (c)(1),
(2), (4) Date: Sep. 4, 2012

(87) PCT Pub. No.: WO2011/112881
PCT Pub. Date: Sep. 15, 2011

(65) Prior Publication Data
US 2012/0319651 A1    Dec. 20, 2012

Related U.S. Application Data (63) Continuation-in-part of application No. 12/659,666, filed on Mar. 16, 2010, which is a (Continued)

(51) Int. Cl.
*H02J 7/00* (2006.01)
*B60L 11/18* (2006.01)
(Continued)

(52) U.S. Cl.
CPC ......... *B60L 11/1816* (2013.01); *B60L 11/184* (2013.01); *B60L 11/1824* (2013.01);
(Continued)

(58) Field of Classification Search
CPC .. B60M 7/003; B60L 11/1824; B60L 11/1816
(Continued)

(56) References Cited

U.S. PATENT DOCUMENTS 5,339,000 A    8/1994    Bashan et al.
5,742,229 A *  4/1998    Smith ................ B60L 11/1824
                                                        235/381

(Continued)

*Primary Examiner* — Drew A Dunn
*Assistant Examiner* — Zixuan Zhou
(74) *Attorney, Agent, or Firm* — John R. Kasha; Kelly L. Kasha; Kasha Law LLC (57) ABSTRACT

Embodiments of the present invention allow multi-space meters and gated parking systems to separately manage and control electric vehicle charging stations located in conjunction with parking spaces. Control is implemented by the meters or other management systems providing codes, for example by printing them on a parking pass or receipt. When entered into the electric vehicle charging station, the code initiates a predetermined interval of charging, or an interval of charging selected by the patron during a transaction with the meter. The code is typically a multi-digit number, and may be encrypted to resist fraud. Data representative of the receipt, including the code, may be made available from an online server and delivered to a parking patron's smartphone or other portable device, whereby parking and vehicle charging may be obtained without first visiting a parking management kiosk and then returning to the vehicle to initiate charging.

19 Claims, 8 Drawing Sheets

Related U.S. Application Data continuation-in-part of application No. 12/659,376, filed on Mar. 5, 2010.

(60) Provisional application No. 61/252,909, filed on Oct. 19, 2009, provisional application No. 61/312,746, filed on Mar. 11, 2010.

(51) Int. Cl.
*G07F 15/00* (2006.01)
*G07F 17/24* (2006.01)

(52) U.S. Cl.
CPC ....... *B60L 11/1825* (2013.01); *B60L 11/1844* (2013.01); *B60L 11/1846* (2013.01); *B60L 11/1848* (2013.01); *G07F 15/005* (2013.01); *G07F 17/24* (2013.01); *B60L 2230/16* (2013.01); *B60L 2240/80* (2013.01); *B60L 2260/58* (2013.01); *H02J 7/0027* (2013.01); *Y02E 60/721* (2013.01); *Y02T 10/7005* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
USPC .......................................................... 320/109
See application file for complete search history.

(56) References Cited

U.S. PATENT DOCUMENTS

| | | | |
|---|---|---|---|
| 2008/0270227 A1 | 10/2008 | Amri | |
| 2009/0287578 A1* | 11/2009 | Paluszek | B60L 3/0069 705/17 |
| 2009/0313098 A1* | 12/2009 | Hafner | B60L 8/003 705/14.1 |
| 2010/0010698 A1 | 1/2010 | Iwashita et al. | |
| 2010/0013434 A1 | 1/2010 | Taylor-Haw et al. | |
| 2010/0301810 A1* | 12/2010 | Biondo | H04Q 9/00 320/155 |
| 2011/0047102 A1* | 2/2011 | Grider | B60L 8/003 705/412 |
| 2011/0057612 A1* | 3/2011 | Taguchi et al. | 320/109 |

* cited by examiner

METHOD AND APPARATUS FOR PARKING LOT METERING USING ACTIVATION CODES

CROSS REFERENCE TO RELATED APPLICATIONS

This application is a continuation-in-part application of U.S. patent application Ser. No. 12/659,666, filed Mar. 16, 2010, which is a continuation-in-part application of U.S. patent application Ser. No. 12/659,376, filed Mar. 5, 2010, which claims the benefit of U.S. Provisional Patent Application No. 61/252,909, filed Oct. 19, 2009, and this application claims the benefit of U.S. Provisional Patent Application No. 61/312,746, filed Mar. 11, 2010. All of the above mentioned applications are incorporated by reference herein in their entireties.

THE FIELD OF THE INVENTION

The present invention relates generally to a system and method for a parking meter to manage one or more electric vehicle charging stations. More specifically, the present invention relates to a system and method wherein a parking meter provides a code usable to activate an electric vehicle charging station.

BACKGROUND OF THE INVENTION

There are a growing number of plug-in electric vehicles (PEVs) and plug-in hybrid vehicles (PHEVs) on the roads of the world. For the sake of this discussion, we refer to all of these vehicles simply as electric vehicles, or EVs. This growing population of EVs will require a rich charging environment, allowing them to plug in and charge under various conditions and times and places during the night and day.

Several companies have begun to supply charging site infrastructure for EVs. These companies are providing their own infrastructure for metering, timing, and billing their customers. These companies often revenue share with city government or private parking lot owners.

EV charging is intrinsically tied to parking: other than hybrid-electric vehicles, EVs must be parked to be charged, and even PHEVs exhibit better economy and a lower carbon footprint when charged from the plug rather than from their fuel-driven generator.

A change occurring in the parking meter industry is being driven by the high cost of infrastructure and the need for more efficient ways to designate, control, and enforce metered parking spaces. This change is a move away from single-space (i.e., one meter per parking space) to multi-space metered parking. "Multi-space" is a general industry term designating as few as one, but often several strategically located payment centers or kiosks, each kiosk serving multiple parking spaces in its proximity, perhaps redundantly.

There are two basic methods currently employed for using a central kiosk-based, multi-space system: one is "pay-by-space" and the other is "pay-and-display".

Pay-by-space parking requires each parking space to have a unique, corresponding number. A customer parks a vehicle in a parking space, notes the number of the parking space, and proceeds immediately to a nearby payment kiosk. At the kiosk, the customer is asked to input the number of the parking space, select an amount of time required, and then pay an appropriate fee, typically using any of several payment methods, including credit card. The customer does not need to return to the vehicle to display a receipt. With pay-by-space, parking enforcement officers can visit the kiosk or otherwise (e.g., though a wireless connection) obtain from the kiosk a list of spaces that should be empty. Vehicles inappropriately occupying a space that should be empty may be ticketed.

Pay-and-display parking does not require parking spaces to be numbered. Instead, a customer parks a vehicle in a parking space and proceeds immediately to a nearby payment kiosk. The customer selects only the amount of time required and pays an appropriate fee, choosing from several payment options as with pay-by-space. The customer is issued a receipt that is date and time stamped and indicates the amount of time purchased. More specifically, the receipt indicates when the amount of time purchased will expire. However, since the kiosk is unaware of which space is being used, the customer must return to the vehicle and leave the receipt on the dashboard so that it is clearly displayed through the windshield. With pay-and-display, parking enforcement officers do not need to visit the kiosk, but instead simply look for and ticket vehicles having either no receipt, or an expired receipt.

OBJECTS AND SUMMARY OF THE INVENTION

The present invention attempts to adapt and make use of existing infrastructure resources, rather than to add expensive new infrastructure.

The present invention allows EV charging and billing to be integrated into new or existing parking meter systems with special emphasis on the newer credit card based, central kiosk, multi-space parking technology.

The present invention operates with either multi-space parking method (pay-and-display or pay-by-space) or with gated parking systems, allows EV charging and billing where available, and offers control over EV charging stations without the addition of hardware to the central kiosk. The following discussion independently examines embodiments of the invention for each parking method.

Pay-by-Space

In this case, the pay-by-space customer would be driving an EV and would be canvassing the parking lot or parking spaces on the street, looking for signage indicating an EV charge enabled parking space. When an open space is found, the customer would park the vehicle and note the unique ID for the space (e.g., the parking space number).

At this point, the customer can plug in a charge cord for charging the EV. Alternatively, this step may be performed upon return to the vehicle following customer's transaction at the payment kiosk.

The customer would then proceed to the payment center kiosk and input the appropriate space number.

The kiosk, based on its database, would know that that unique number corresponds to an EV charging space.

In one embodiment, the kiosk may notify the customer and confirm that this is an EV charging space. If customer confirms, then the kiosk can display the times and parking fees for that space.

In such an embodiment, the kiosk may restrict issuance of the parking space, if as a matter of policy parking in that space is reserving for EVs, either all of the time, or for certain hours. If the customer indicates that no EV charging will be used, the kiosk cancels the transaction.

In an alternative embodiment, the kiosk does not specifically notify or confirm that this is an EV charging space.

As a matter of policy, there may be a premium attached to parking in the EV space and/or for use of the EV charging unit. Further, such premium may only be for certain hours, e.g., for those hours when EV charging is in greatest demand, or for those hours when charging is available. This will be flexible and programmable within the context of the software of the billing kiosk and central billing network.

In general, the customer completes a financial transaction through the kiosk for an interval of parking and EV charging. The duration of the interval may be predetermined and fixed (e.g., "one-hour", or "all-day"), or the duration may be entered by the customer, subject to policy constraints (e.g., "not to exceed three hours"). At the conclusion of the transaction, the kiosk provides a receipt to the customer comprising a code suitable for entry by the customer into a keypad associated with the EV charging unit.

The customer returns to the EV charging unit and enters the code from the receipt into a keypad associated with the EV charging unit. In response to having been presented with the code, the EV charging unit becomes enabled for the duration of the interval and the customer's electric vehicle receives electricity for charging.

Note that, as used herein, the 'keypad' can be any device providing the functionality of a keypad, such as a keyboard or other arrangement of buttons, and may be physical or virtual, such as buttons drawn on a display having a touch-screen surface.

Pay-and-Display

With the pay-and-display system, the appropriate EV parking spaces would be designated by signage or other mark indicating the availability of EV charging. Though, in the alternative, this can be recognized by the presence of an EV charging station.

The parking management system kiosk is programmed to know that some spaces within its area are EV enabled, but does not know if the customer chose one of those spaces. The kiosk must query the customer as an initial step in the transaction: Is your space EV enabled? If the response from the customer is "Yes", then the kiosk shows the appropriate time and fee schedule for an EV charging space, otherwise the non-EV schedule is shown.

After the customer has completed the payment transaction, a receipt is printed and provided that the customer must display in the vehicle's window. If parked in an EV space, the receipt should have an indicia designating payment for an EV enabled space. Perhaps it might be as simple as a large "EV" printed at the top or bottom. Additionally, this receipt (or a second receipt provided) comprises a code, as above, suitable for being entered into the keypad for an EV charging station.

This method has the slight drawback that, barring additional description for a unique charging station, the code provided will be usable to enable any of the charging stations to be managed by the kiosk providing the receipt. If the customer (or someone reading his code from the pass displayed on the dashboard) were so disposed, the receipt could end up being used to activate each of the charging stations nearby. However, since the parking spaces are being managed under pay-and-display rules, only one vehicle will ultimately be displaying the receipt issued, any other vehicle parked at an inappropriately enabled EV charging station would be in violation, whether or not the charging station had been enabled.

This problem can be overcome according to another embodiment, in which most of the parking operates as pay-and-display, except for the EV charging spaces, where individual charging station has an identification number. The parking kiosk queries for this number once it has established that the customer seeks EV parking. This allows the code to be customized for the specific space for which the ticket is issued, and thus the code can't be used for other parking spaces.

Gated Parking

In a gated parking system, a patron is admitted to a gated parking area on the basis of an admittance ID, whether issued at the entrance (e.g., a ticket provided at the entry gate) or previously issued or registered (e.g., a monthly parking pass or an employee ID, respectively), and the time of entry is associated with the admittance ID. Upon exiting the parking area, the same admittance ID is presented and the parking fee is computed based on the difference between the exit and entry times.

In one embodiment of the present invention, the patron may receive a code for enabling an EV charging station located inside the parking area. The code may be provided either upon request at the time of entry, or through a subsequent transaction in which the admittance ID is again presented at a kiosk or pay station in or near the parking area. In this way, the provision of the code is associated with the admittance ID and can alter the computation of the parking fee at the time of exit from the parking area.

In the gated parking environment, the code is used to enable the EV charging station, but the charging station is not constrained to operate for a particular, limited interval. Unlike the pay-by-space and pay-and-display, which are typically pay-in-advance methods of parking management, gated parking is often (but not always) a pay-as-you-leave method. As such, it may matter little that the charging interval is not predetermined or specified in advance by the patron. Instead, the parking management system measures the duration of parking and charges accordingly, after the fact.

A drawback that inhibits wide adoption of electric vehicles is the lack of infrastructure for conveniently charging them; and while hybrid electric vehicles are increasingly popular, plug-in versions that operate to maximize use of their battery and minimize use of their gasoline-fueled generator are rare, in part due to the same lack of infrastructure.

Provision of a vehicle charging infrastructure is inhibited primarily by cost: Such infrastructure has been expensive, typically requiring allocation of a physical location that vehicles can access and providing new electric service to that location.

One embodiment of the present invention allows the management of one or more EV charging stations with a minimum of communications infrastructure required. The charging station must be outfitted with keypad and processor having a connection with which to enable the EV charging circuit.

In an alternative embodiment, a financial transaction can be conducted through the Internet, rather than at a kiosk. In this embodiment, data representative of the transaction, comprising at least the code, is provided to the customer's portable computer, PDA, cell phone, or smartphone (e.g., as an email or an SMS message, or downloaded with an application running on the device). At the EV charging station, the code is recalled on the customer's device (e.g., phone) and displayed so it can be entered by the user into the keypad associated with the EV charging station as above.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
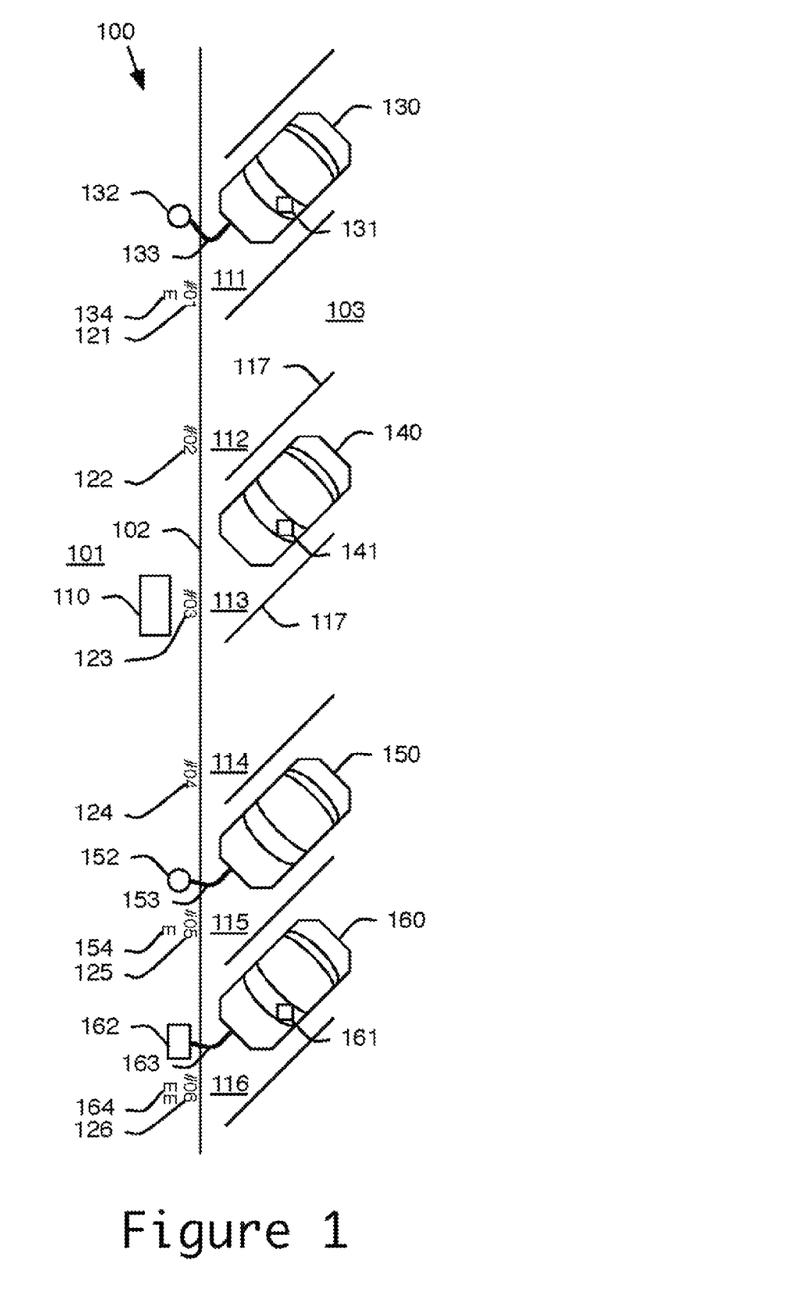
FIG. 1 is a plan view of a parking area under management of the present invention.

Referring to FIG. 1, sidewalk 101 is separated from street 103 by curb 102. Parking area 100 comprises parking spaces 111-116. The parking spaces are divided from each other by lines 107 painted in the street. Payment terminal 110, located on sidewalk 101 in proximity to parking spaces 111-116, manages parking area 100 either alone or in conjunction with other terminals or remote systems (not shown).

Currently, four of parking spaces 111-116 are occupied: space 111 is occupied by vehicle 130, space 113 is occupied by vehicle 140, space 115 is occupied by 150, and space 116 is occupied by vehicle 160.

Depending on the mode of operation, a vehicle may display a parking pass provided by payment terminal 110 on its dashboard. In FIG. 1, three of the four vehicles are displaying a parking pass: vehicle 130 is displaying parking pass 131, vehicle 140 is displaying parking pass 141, vehicle 160 is displaying parking pass 161. Vehicle 150 is not displaying a parking pass.

Also depending on the mode of operation, each parking space 111-116 may be uniquely identified. In FIG. 1, each parking space 111-116 bears corresponding unique identification indicia 121-126. For example, space 112 bears the number "#02" as shown by identification indicia 122.

Some spaces have particular properties. For example, spaces 111 and 115 are adjacent to streetlights 132 and 152 respectively, each having outlets for charging electric vehicles. In this example, these outlets are Level 1 charging outlets, providing about 1,500 W of electrical power, which can charge a typical electric vehicle in about 8 hours. Space 116 is adjacent to a high-capacity charging station 162 for charging electric vehicles. Level 2 chargers, such as station 162, can provide from about 3,000-20,000 W and can charge a typical electrical vehicle in 30 minutes to 4 hours, depending on the particular voltage and current available. While the outlets near spaces 111, 115, and 116 are all suitable for charging electric vehicles, the high charge rate of charging station 162 makes it suitable for a quick charge, and this is a property of space 116 not conferred (in this example) by the outlets on streetlights 132 and 152 to their corresponding spaces 111 and 115.

In FIG. 1, the vehicles parked in spaces 111, 115, and 116 are shown plugged into the corresponding charging outlets on streetlights 132 and 152, and charging station 162 with corresponding cables 133, 153, and 163.

In some modes of operation, spaces 111 and 115 are marked with property indicia 134 and 154, respectively, to indicate their property of Level 1 electric vehicle charging. In this example, property indicia 134 & 154 is a single letter "E". Similarly, space 116 is marked with property indicia 164 to indicate its property of Level 2 electric vehicle charging, which herein is shown as "EE".

Parking spaces may have other properties. For example, and not by way of limitation, a parking space may have an electrical outlet to be used for engine block heating during extremely cold weather, or a parking space may be covered, a premium in hot or stormy weather.

Such properties may be valuable at anytime (e.g., electric vehicle charging), or only in certain conditions (e.g., engine block heater). On a mild spring day there may be no value to an engine block heater or having a covered parking spot.

Parking spaces lacking exceptional properties such as those mentioned have the property of being ordinary. Such spaces may be marked with a property indicia (not shown) corresponding to being ordinary spaces.

Figure 2:
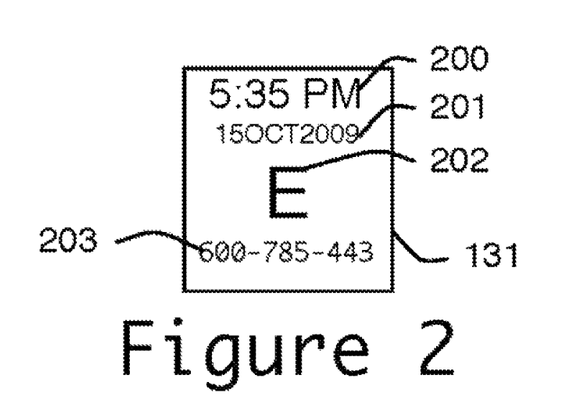
FIG. 2 is a ticket for electric vehicle parking having a code representing authorization for an interval for charging.

FIG. 2 shows a pass 131 provided by kiosk 110 and displayed in vehicle 130, showing human-readable indicia such as the time of expiration 200, the date of issue 201, and property indicia 202 corresponding to the kind of space 111, an "E" for Level 1 electric vehicle charging. In some embodiments, pass 131 may also comprise an identification indicia (not shown) corresponding to identification indicia 121.

Additionally, code 203 is provided, in this example representing the time of expiration 200, date of issue 201, and space number 121, "#01". In this example, code 203 comprises an encrypted number, the number being comprised of multiple multi-bit fields, each multi-bit field representing one of date of issue 201, time of issue (not printed as human-readable indicia in this embodiment), and time of expiration, the space number 121, and a checksum field. The encryption used for this example is a simple version of the one taught by Rivest et al. in U.S. Pat. No. 4,405,829. In this case, code 203 is "600,785,443" which is one possible encryption of the number "257,404,951" which is the decimal expression of a 29-bit binary number. The choice to limit the code to a 29-bit representation is made for this example because the decimal expression of a 29-bit number has, at most, 9 digits, which is a reasonable number of digits to type in a code. A 30-bit number can require up to ten digits. While the 29-bit choice provides reasonable properties discussed below, more or fewer bits can be used, depending upon the properties required. Further, the parameters for the encryption algorithm have been selected to result in a 29-bit number, so that the number of digits in the presentation of the code is not inflated by the encryption technique. These choices are discussed further:

In the present example of code 203, the twenty-nine bits are divided into the following fields (starting with the most significant bits):

The first field is five-bits long, and represents the day of the month from 1-31, which is "15" in this example, or "01111" in binary. Using only the day of the month to represent the issue date means that codes for a specific charging station could repeat each month, however the printed issuance date shows the wrong month, and would risk receiving in a citation. Other choices for representation of the issue date in this field could include additional bits, or combine the month, year and day in a way to make the issue date portion of the code less predictable (e.g., summing the year, month, and day, modulo the maximum value expressible in this bit field given the field length selected).

The second field is an eight-bit field representing the time of issuance. In this example, the issuance time (not printed on ticket 131, though it could be), is "8:45 AM". To fit a time-of-day into an eight-bit field, the following procedure is used: Convert the time to a number of minutes after midnight (which could be from 0-1439) and divide by 6, rounding down the result to an integer (which could be from 0-239). The result expresses the time as a number of six-minute intervals since midnight. In this example, "8:45" produces (8×60+45)/6=525/6=87.5, which is rounded down to "87". Expressed as an 8-bit binary value, this becomes "01010111". More bits in this field would allow a more precise representation, though it would take eleven bits to represent any time-of-day with one-minute precision. In cases where paid parking is limited to only a few hours per day (e.g., from 9 AM-5 PM) issuance time may be constrained to those hours. Parking passes sold prior to that interval would have an effective issuance time of 9 AM, and after that interval, parking passes would not be sold. Such a constrained interval could be represented with a precision of one-minute, in only nine bits. More complex representations are possible, for example, times outside of the interval could be represented using a lookup table applying to binary values not otherwise used in expressing times within the interval. For example, the eight-hour interval from 9 AM to 5 PM only can be represented as a number of minutes from 0-480. However, a 9-bit number can represent values from 0-511. The unused values from 481-511 can each be used for a particular representation, e.g., the value of "481" can represent times from midnight until 1 AM, "482" can be from 1 AM to 2 AM, and so on.

The third field is also an eight-bit field, representing the expiration time, and may use the same formula as for the time of issuance, but rounding up, instead of rounding down (giving the parking patron the benefit of the rounding error). In this example, expiration time 200 is printed on ticket 131: "5:35 PM" is "17:35" when expressed in a 24-hour format, and (17×60+35)/6=1055/6=175.83, which rounds up to "176", or "10110000" in binary. As with the issuance time, other choices for representation within this field are possible. Rather than expressing a expiration time, this field may represent a duration. If parking is limited to some maximum, e.g., a 2-hour limit, then the duration may have a representation for which that is the maximum value. Further, parking might be sold in particular increments, e.g., 15-minute increments, in which combined case, the amount of parking which could be paid for might be from 1-8 increments of 15-minutes, and could be represented in a 3-bit field (a savings of 5-bits that would shorten the code from nine digits to eight digits). Similarly, if parking was offered in discrete, but unequal intervals such as short-term (30-minute), long-term (2-hour), and all-day (until midnight), these options could be represented by predetermined values in a very small bit field (in this case, a 2-bit field).

The fourth field in this example is a four-bit field representing the charging station identifier. For pass 131 for charge station 132, this corresponds with identification indicia 121, thus the identification "01", which in binary is "0001". A four-bit field can distinguish up to sixteen different station identifiers. If fewer stations are needed (e.g., were each kiosk 110 to only control from one to four charging stations), then fewer bits might be required for this field. If the station identifier field is omitted (and it can be), then a properly issued code may activate any of the charging stations 132, 152, and 162 managed by parking management system kiosk 110. This is not unreasonable when parking enforcement patrols frequently enough to make the behavior of reading a recently-issued code off someone else's dashboard to illicitly activate your charging station too risky.

The fifth field in this example is a simple four-bit checksum, that is, the sum of the first four fields, modulo "16", which for this code is "7", or "0111" in binary. Rather than a checksum, this field could instead be a hash, a random number (i.e., "salt" for use in the encryption), or be omitted or shortened to reduce the number of digits in the code 203. The advantage of a checksum (or hash), is that it provides further verification for the code, making it harder to guess a legitimate code. For example, if someone were to guess a code that produced viable date, start, duration, and station identification fields, their chances of activating the station are still be reduced by needing to get the checksum correct. A predetermined value can be used for this field, with similar effect. However, choosing a random number for this field does not assist in reducing the chances of guessing a valid code, since the number cannot be used to validate the code.

Thus, the unencrypted version of code 203 comes from a bit sequence of the form:

'ddddd sssssss eeeeeeee nnnn cccc' where 'ddddd' represents the binary value for the day of the month, 'sssssss' represents the start time, 'eeeeeeee' the expiration time, 'nnnn' represents the charge station identifier, and 'cccc' is a binary checksum of the other bit fields. The spaces are added here for clarity and are not present in the binary number. Thus the unencrypted version of code 203, based on the choices listed above, is:

"01111 01010111 10110000 0001 0111"

which converts in decimal to the nine-digit number "257,404,951".

The number resulting from the sequence of bit fields on which code 203 is based is encoded to conceal the organization and nature of the bit fields that might otherwise be trivially discernable from a collection of several parking passes made (e.g., by photographing parking passes on the dashboards of vehicles, or from one's own parking passes saved over a period of weeks). Preferably, this encoding is different for different parking areas 100, or even different charging stations 132, 152, 162. Thus if the encoding is cracked for a parking area 100, or for an individual parking station 132, other parking areas (not shown) or charging stations 152, 162 are not simultaneously cracked. Thus, diligent effort would be required to produce fraudulent codes to activate a charging station, and this same level of effort would be required for each parking area or charging station, and the fraudster would still require an appropriate counterfeit parking pass to avoid detection.

As used in this example, an encryption key is used by the parking management system kiosk 110 to encode the number and produce code 203, and a decryption key for use by the charging station 132 to decode code 203. In accordance with the encryption technique taught by Rivest et al., the encryption key comprises a carefully chosen encryption exponent "e" and modulus "m" and the decryption key comprises a corresponding decryption exponent "d" and the same modulus "m". For this use, the modulus "m" must either be larger than the largest number producible by the fields selected, or the encryption process must break the number up into multiple blocks and encrypt each separately. In the present examples, the modulus "m" is constructed to be larger than the maximum number obtained from the fields. The code "c", such as code 203, is the encryption of the number "n" from EQ. 1.

$$c=(n\hat{\,}e) \text{ modulo } m \qquad \text{EQ. 1}$$

Decrypting "c" to recover "n" is achieved with EQ 2.

$$n=(c\hat{\,}d) \text{ modulo } m \qquad \text{EQ. 2}$$

In the examples presented herein, e=558,343; d=1,787; and m=997,852,573 and are appropriately selected values. For n=257,404,951 as constructed from the above binary fields, the code 203 is computed from EQ. 1 as:

(257,404,951^558,343) modulo 997,852,573 which equals 600,785,443 as shown as code 203 in FIG. 2. Note that calculations of this nature are not supported on ordinary calculators, and special algorithms (collectively known as "exponentiation by squaring") are used to compute exponentiation to large integer values in modulo arithmetic. However, at this time, the freely available computational resource offered at www.WolframAlpha.com by Wolfram Alpha LLC, of Champaign, Ill., is able to accept the expression as typed above and provide the numeric result described. The decrypting of code 203 is achievable with EQ. 2, and would be performed as discussed below in conjunction with FIG. 8.

Note that 29-bits produces a relatively small number, so the encryption here serves to obfuscate the origin of the code values, rather than providing a high level of security. Encryption also serves to make temporally related codes non-sequential (i.e., the next valid code not a simple modification of an earlier code). This minimizes the likelihood that casual guessing will be successful, and makes code analysis substantially more difficult. Further, a fair number of examples of valid codes would be needed, as would be knowledge of how the codes were constructed (and there are a number of options to be considered). Additionally, by selecting different values for the keys (i.e., different values for "e", "d", and "m"), a distinct encryption can be provided for each charging station or each parking area 100, though that is not the case in the present examples.

Figure 3:
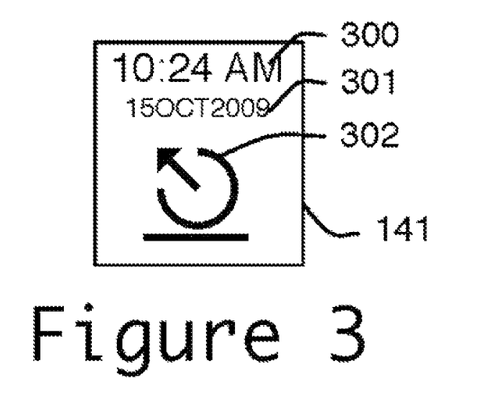
FIG. 3 is a ticket for parking without electric vehicle charging.

FIG. 3 shows a pass 141 provided by kiosk 110 and displayed in vehicle 140, showing human-readable indicia representing the time of expiration 300, the date of issue 301, and since space 113 is an ordinary parking space, instead of a property indicia corresponding to kind, a clock face 302 shows a graphical version of the time of expiration 300. In an alternative embodiment, all passes could show a clock face such as 302 to illustrate expiration time.

Figure 4:
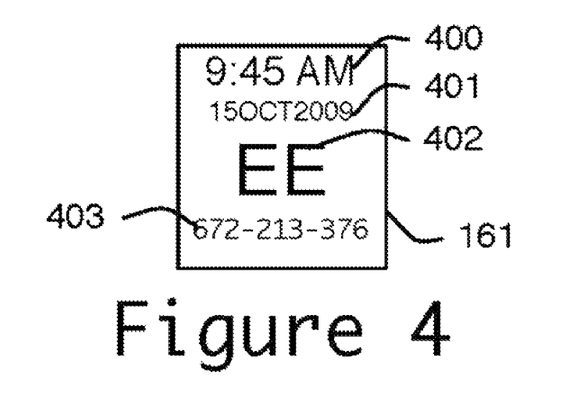
FIG. 4 is another ticket for electric vehicle parking having a different code representing authorization for an interval for charging.

FIG. 4 shows a pass 161 provided by kiosk 110 and displayed in vehicle 160, showing human-readable indicia representing the time of expiration 400, the date of issue 401, and property indicia 402 corresponding to the kind of space 116, an "EE" for Level 2 electric vehicle charging. Additionally, code 403 is provided, in this example representing the time of expiration 400, date of issue 401, and space number 126, "#06" and time of issuance "8:45 AM" (not printed on pass 161). Code 403 is an encryption of the number the text "257,385,070", which is composed of five bit fields as described for the number represented by code 203. The first and second fields (date and issuance time) are the same as for the number represented by code 203. However, since the expiration time 400 ("9:45 AM") is different than expiration time 200, the third field is calculated to be (9×60+45)/6=585/6=97.5, which rounds up to 98, or "01100010" in binary. Field four represents the station identifier 126 "06", or "0110" in binary. The checksum of field five is different, too, being "14" in this case, which is "1110" in binary. Thus the unencrypted version of code 403, based on the choices listed above, is:

"01111 01010111 01100010 0110 1110"

which converts in decimal to the nine-digit number "257,385,070". When encrypted, using the same values for "e" and "m" as above, EQ 1 gives:

(257,385,070^558,343) modulo 997,852,573 which equals 672,213,376. Note that though three of the nine digits in the two numbers used to generates codes 203 and 403 match, there is only a single digit matching between codes 203 and 403, illustrating the obfuscation of the encryption at work.

Figure 5:
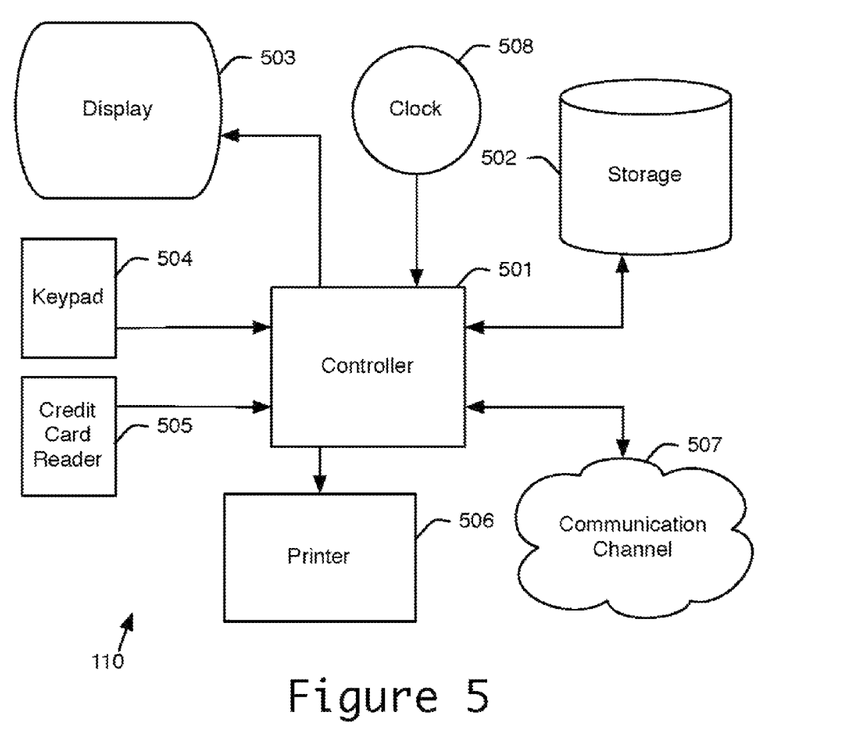
FIG. 5 is a payment kiosk for managing a parking area and providing receipts.

FIG. 5 is a block diagram suitable for implementing the parking management system payment station kiosk 110. A controller 501 has access to storage 502, a display 503 or other user interface output device, keypad 504 or other user interface input device (e.g., a touchscreen, not shown), a credit card reader 505 or other payment acceptance device (e.g., an RFID reader, coin or bill acceptor, etc.), a printer 506 for printing parking passes and/or receipts.

In some embodiments, controller 501 may have communication through a channel 507, for example to allow remote management (e.g., allowing an administrator to monitor the operations of terminal 110 or to modify data in storage 502), access to remote data tables (e.g., to update tables kept locally in storage 502, or to upload a snapshot of current status), or to allow remote reporting (e.g., to a terminal belonging to a parking enforcement officer), or allow remote payment (e.g., to a service accessed from a motorist's cell phone), or to communicate with a remote payment service (e.g., a credit card bureau). Clock 508 may be used to track date and time, or access to date and time may be provided to controller 501 through communications channel 507.

In the present invention, controller 501 may cause printer 506 to print indicia (e.g., either human-readable expiration time 200) onto a parking pass (e.g., 131) or receipt. In addition, controller 501 also causes printer 506 to print a code, such as codes 203 and 403, on passes for use with charging stations 132, 152, and 162. The codes are calculated by controller 501 as described above, using information obtained from a parking patron (such as whether parking is requested for station identifier 121, 125, or 126; and what duration for parking is requested). Additional information is used to populate the other fields, such as the date and time indicated on clock 508 (which should substantially correspond to the date and time on the clock 613 in FIG. 6, discussed below). If a checksum (or hash) is employed, it can be calculated from these data. The fields are concatenated or otherwise combined (e.g., by mixing bit positions according to a predetermined pattern) and the resulting number is encrypted using an encryption key (e.g., "e" and "m", above). The encryption key may differ by parking area 100, or by charging station, depending upon the implementation.

In an alternative embodiment, the fields derived from the date and time of issuance may instead be a checksum or hash of the present date and/or time. Since both the code-creating kiosk 110 and the code-reading charging station (e.g., 132) can know the current date and time, it is sufficient for the code-reading kiosk to create a hash or checksum of the current date and time and compare it to one extracted from the code. If it matches, the code represents a current authorization, whereas if it does not, the code may be considered non-current. Note that to account for clock drift and other sources of marginal synchronization, a check may be made using adjacent times also. For instance, if time is represented in six-minute intervals, then a check of plus and minus six-minutes from the current interval may be made. A trend of codes provided to a charging station by patrons regularly representing issuance times that appear ahead or behind the time of the charging station may be used by the charging station to determine that its clock is running slow or fast, respectively, and it may compensate in the future.

Figure 6:
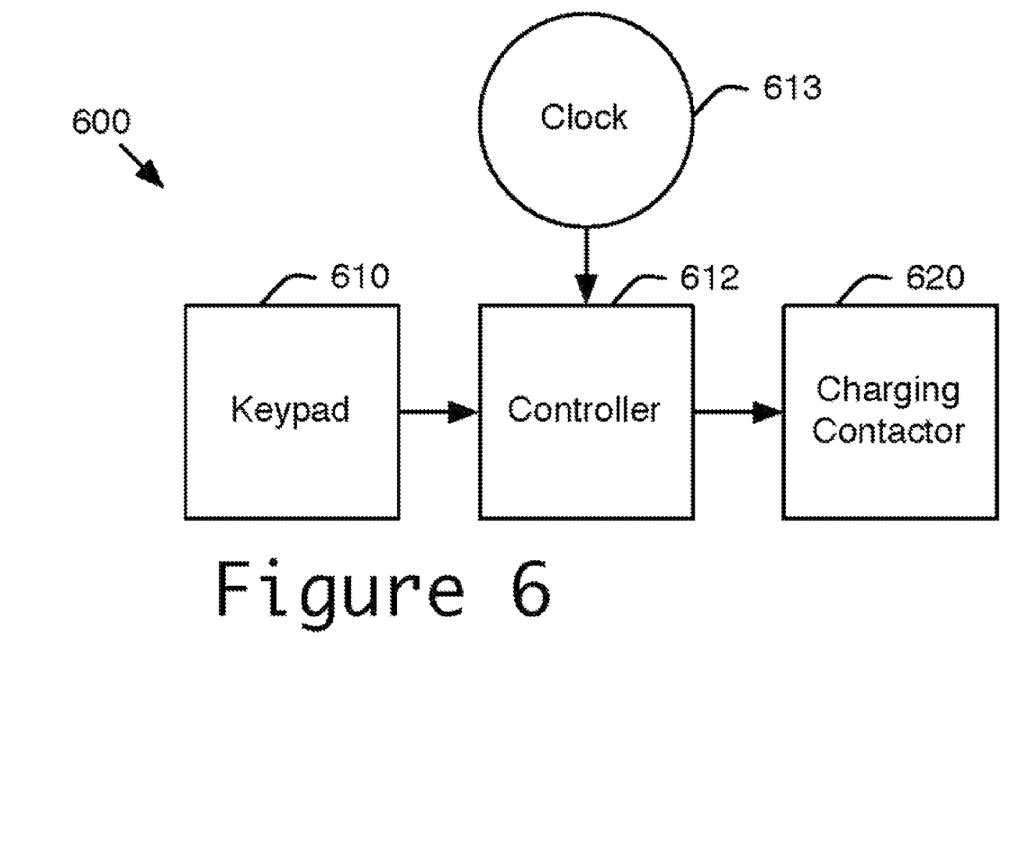
FIG. 6 is a block diagram for an code-accepting EV charging station of the present invention.

A block diagram of charging station 600 is shown in FIG. 6, and may represent any one of stations 132, 152, and 162. Station 600 has a keypad 610, which accepts a code entered by a parking patron having a pass or receipt with a printed code such as 203. When accepted through keypad 610 by controller 612, the code is decrypted using EQ. 2 and the appropriate decryption key (e.g., exponent "d" and modulus "m"). The resulting number is broken into the individual bit fields, which if authentic, will have a date and issuance time that is close to the current time shown by clock 613 (accounting for long-term drift as discussed above), will match the station identifier (stored in the memory of controller 612, not shown), and have appropriate values in the field for the checksum (or hash). If the controller is able to validate the code entered in this way, then the charging contactor 620 is enabled for an interval ending at the expiration time indicated (or, if the field carries an indication of duration rather than expiration time, then contactor 620 is enabled for an interval having the duration indicated). For example, if clock 613 indicates that it is currently 4:35 PM and the fields of the number obtained by decrypting the entered code indicates an expiration time of 5:35 PM, then controller 612 determines that contactor 620 should be enabled for one hour, or until 5:35 PM.

In some embodiments, only some of the fields may be encrypted when forming code 203 on pass 131. For example, the station identifier field may be left unencrypted, and may be pre-pended to the rest of the code. In such a situation, all codes for station 132 (having the identifier "01") would start with a "1" and the remaining eight digits would be the result of the encryption (which would require a different length modulus to produce shorter encrypted codes).

In some embodiments, the fields encrypted to form code 203 may comprise nothing of expiration time or duration, and controller 612 may operate instead to initiate a charging interval of a predetermined duration, or until a predetermined time. This embodiment would be appropriate if there were a single price for a predetermined parking interval (e.g., parking for one hour, or all-day parking with the lot closing at 8:00 PM). In such a case, one of the fields used to generate code 203 may comprise a unique pass identifier (not shown), which allows controller 612 to ignore subsequent entries of the same code, or to display the ID of the pass that enabled the current parking interval (display not shown).

Contactor 620 enables charging of a connected EV, and operates at the command of controller 612. When contactor 620 is enabled, an EV (e.g., 130) properly connected with a cable (e.g., 133) to an instance (e.g., 132) of charging station 600, is able to charge. In some embodiments, a telltale (not shown) may indicate the status of contactor 620 or of other charging equipment activated by contactor 620.

Figure 7:
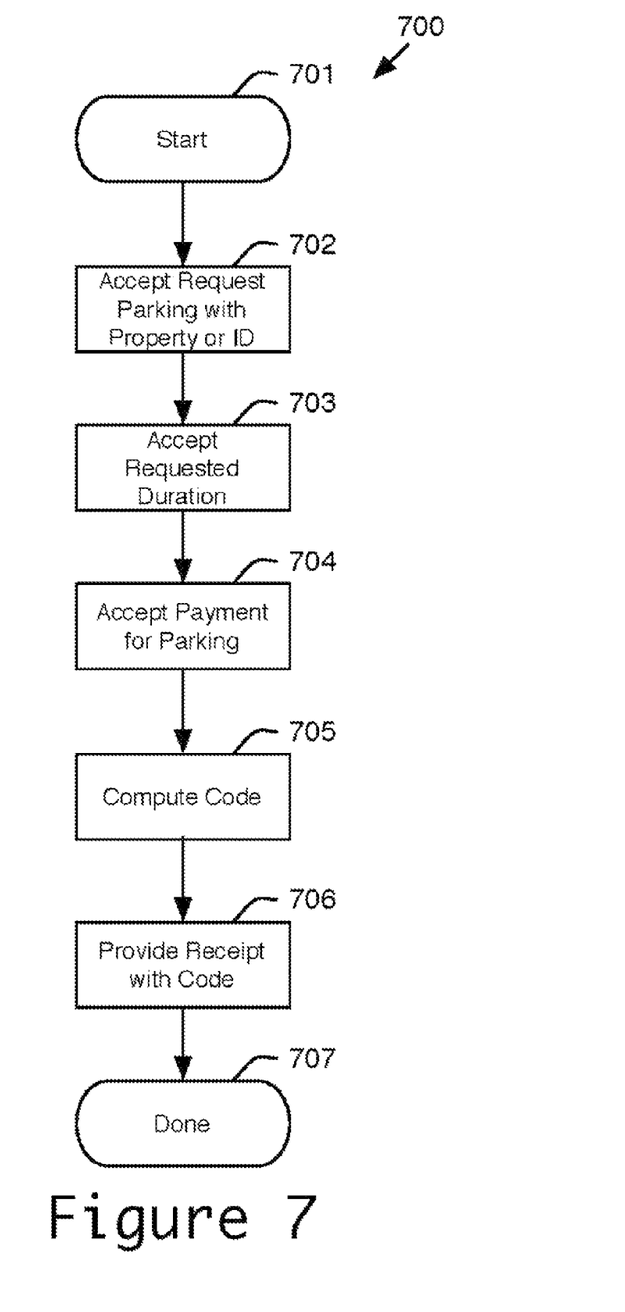
FIG. 7 is a flowchart for a transaction to obtain parking and the use of a device (e.g., an EV charger) under the present invention, the transaction resulting in the customer receiving a code representing the authorization to use the device; and, FIG. 8 is a flowchart for the activation of a device (e.g., an EV charger) associated with a parking space, using the code.

FIG. 7 shows a parking transaction process 700, which may be used for either pay-and-display or pay-by-space. The process starts at 701, usually (though not necessarily) with the parking patron having already parked a vehicle in a particular parking space and approaching a parking kiosk to engage in this transaction.

In step 702, the parking management system (typically the kiosk 110) accepts a request for parking from the patron, which may include a parking space identification (e.g., the number from identification indicia 121) for a pay-by-space transaction, or a property of the parking space (e.g., Level 1 EV charging) for a pay-and-display transaction. If the kiosk is only supporting parking spaces having common properties, then for pay-and-display, the property is not needed as part of the request. For pay-and-display, a parking space identification may still be requested, if this is a required field for generating the code. The request may be entered using keypad 504, or touchscreen (not shown) on display 503. The system's readiness to accept a parking request would be shown on display 503.

In step 703, the system accepts a duration for parking, unless the duration is predetermined (e.g., one hour, or all-day). The duration may be provided as an end time (e.g., until 5:00 PM) or as a length of time (e.g., ninety minutes). The duration can be provided by the patron using keypad 504, or touchscreen. If a duration is needed, the system can request it using display 503.

If parking is not free, then in step 704, the system accepts payment or account information that the patron presents. The system may accept payment with credit card reader 505, or other means (not shown) such as a coin or bill acceptor, a value card or smartcard reader (the value of which may be decremented), or a reader for a form of identification (e.g., an employee card or an RFID tag) that indicates the patron is entitled to parking or that otherwise identifies an account to be billed. If needed the system can request payment and indicate the amount paid so far and the amount remaining using display 503. If needed, communication channel 507 may be used while accepting payment, for example to contact a credit card service. The parking request, duration, and payment information may be recorded in storage 502 for later reporting.

Once the parking request with property (if needed), station identifier (if needed), and duration (if needed) have been accepted, then at step 705 the system populates the appropriate fields to create number "n" and encodes or encrypts "n" to produce code "c", such as code 203 and the receipt or parking pass is provided with the code using printer 506.

The parking transaction process 700 is completed at 706.

In a gated parking environment, where the patron already possesses an admittance ID, or is being provided with one, the step 704 would be replaced by a step wherein data representative of having issued an EV charger activation code to the patron is associated with the patron's admittance ID. In this way, when the patron is exiting the gated parking area, there will be a record associated with his admittance ID that his parking stay included not only parking for the measured duration, but also EV charging.

Figure 8:
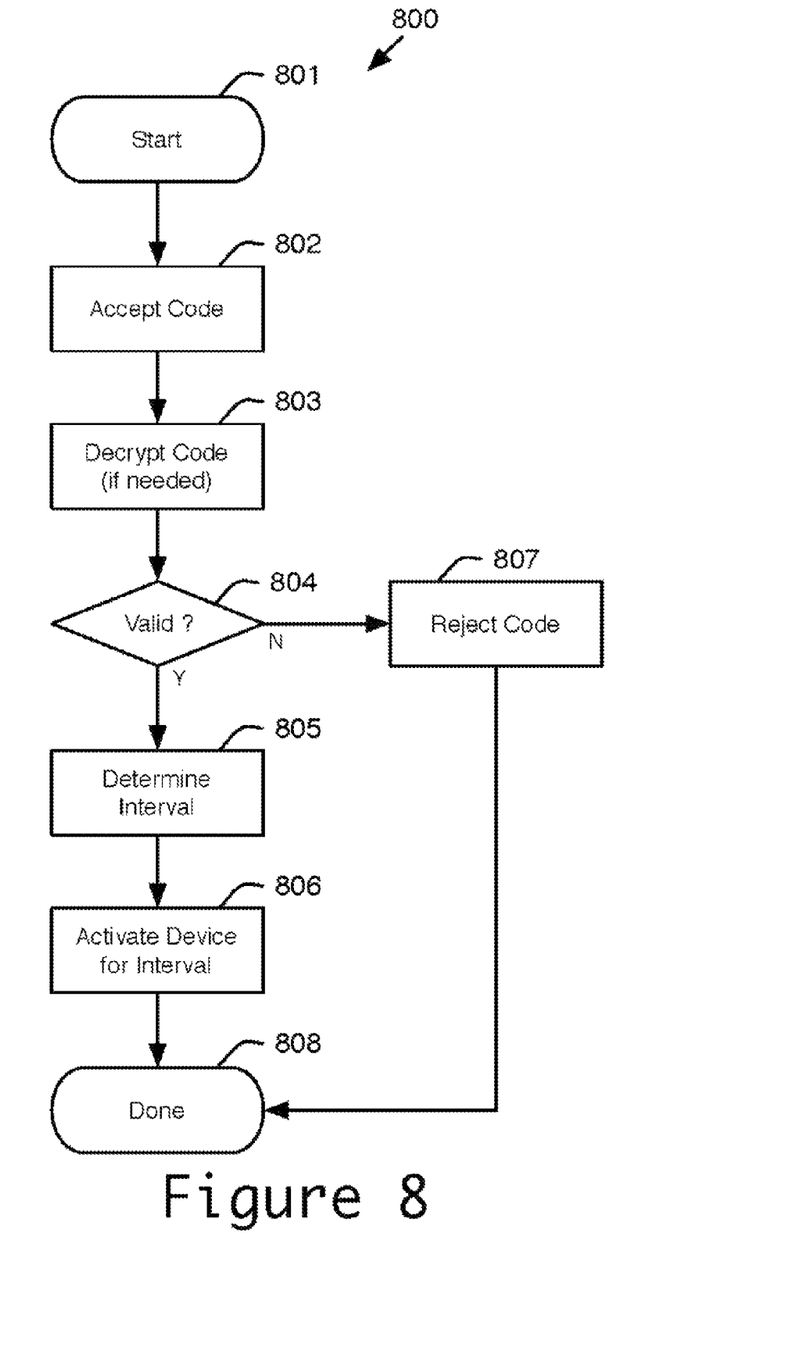

FIG. 8 shows activation process 800, in which a device, for instance the EV charging station, is enabled for an interval determined by the code provided from parking system transaction 700.

Activation process 800 starts at 801 with the patron having received a receipt bearing the appropriate code. In step 802, the code is accepted through keypad 610 when entered by the patron. The code is decrypted in step 803, for example by using the decryption formula of EQ. 2.

(600,785,443^1,787) modulo 997,852,573

With "c" set to the example code 203, using the decryption key comprising exponent d=1,787 and the same modulus "m" as above, EQ. 2 reconstitutes the number "257,404,951" which can then be further broken up into the individual bit fields which it comprises. (This expression, too, is not supported by ordinary calculators, but can be entered directly into the WolframAlpha site as previously described as a demonstration and confirmation of these example equations and values. The inventors are NOT proposing that this web site be used to implement one embodiment of the present invention.)

At step 804, a check is made to determine whether the fields of the decoded number are valid. As previously described, for this example, the first field represents the current day of the month. This should match the current day of the month indicated by clock 613. The second field indicates the time of issuance. This should be about the time currently indicated by clock 613, or somewhat later, according to policy (e.g., the code could be accepted only within a few minutes of issuance, an hour, or anytime until the pass expires). The fourth field is the station identifier, and should match the station identifier known to controller 612. The fifth field is the checksum for the other fields and should match with the checksum computed by controller 612 from the other fields. If any validation measure detects an invalid code, the activation process 800 rejects the code at step 807. If the device (e.g., charging station 600) has a display or indicator lights (neither shown), the reason for the rejection may be shown to the patron. Otherwise, the code entered by the patron through keypad 610 is considered valid and processing continues at step 805.

At step 805, the appropriate interval is determined from the value presented in the third field, unless the system uses a predetermined interval. If the field represents an end time, as in the example above, and a duration is needed, the duration can be obtained by taking the current time from the clock 613 and subtracting it from the end time provided by the indicia, to produce a duration for activation. Similarly, if the value presented in the third field is a duration (not shown) and an end-time is needed, the end time would be the sum of the duration added to the current time from clock 613, or to the time of issuance from the second field (which of the two being a matter of policy).

In step 806, controller 612 enables the output circuit (e.g., EV charging circuit contactor 620) by setting a timer (whether implemented in hardware or software) for the interval determined. Upon expiration, the timer will disable the output (e.g., contactor 620). The timer may disable the output when the end time is reached on clock 613, or the timer may be set to hold the output enabled for the duration determined, depending upon implementation. In this way, contactor 602 for electric vehicle charging, or another controlled property, is activated for the appropriate interval, whether expressed by an end-time or a duration, in accordance with the implementation.

In an alternative embodiment, parking transaction process 700 may be conducted without the patron directly approaching parking system kiosk 110. For example, using a personal computer, PDA, cell phone, or smartphone, the patron may communicate with the parking system controller 501 (which may be implemented in a remote server rather than kiosk 110 located in parking area 100) through communication channel 507, which may comprise the Internet, or (if the implementation is inside of kiosk 110) merely a local wireless network, such as a WiFi or Bluetooth connection. Through communication channel 507, controller 501 prompts for and accepts the parking request with property (if needed), station identifier (if needed), duration (if needed), and payment (if needed). If the transaction is being conducted from a location not near parking area 100, then a start time may also be prompted for and accepted from the patron. In step 705, data representative of at least the code, but preferably other information normally found on the receipt or parking pass is provided to the patron's computer, cell phone or smartphone. Such data may be a digital image, or may be a data object to be rendered as an image by an application running on the patron's computer, PDA, or phone. In one embodiment, this electronic receipt may be printed by the patron, for dashboard placement in a pay-and-display situation. In another embodiment, the code may be displayed on a screen of the patron's cell phone or smartphone for presentation to the patron when needed for entry into keypad 610. The data representative of the receipt may be provided as text, for example an SMS message or email, which can then be printed or displayed on a screen for recall by the patron when needed. This method allows a patron to complete the parking system transaction 700 either in advance of arriving at parking area 100, or while still in his vehicle upon first parking in parking area 100. In this embodiment, immediately upon exiting his car, a patron already has the code ready for entry into keypad 610 at activation process step 802, instead of visiting kiosk 110 and returning with a receipt from printer 506 of kiosk 110. Otherwise, activation process 800 proceeds as described.

Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. For example, while many of the foregoing embodiments used the specific encryption method of Rivest et al., those skilled in the art will recognize that many other forms of encryption or coding can be used to achieve the results of the present invention. Thus, while preferred embodiments of the present invention have been disclosed, it will be appreciated that it is not limited thereto but may be otherwise embodied within the scope of the following claims.

We claim:

1. A system for charging electric vehicles comprising:
    a keypad for a user to enter a code, said code to have been provided to the user in a transaction that established a time interval of charging;
    a controller having communication with said keypad, said controller to validate that said code is issued to represent authorization for the time interval of charging, said controller having a timer to determine an expiration of the time interval, wherein, in response to said code being validated, said controller initiates the timer and enables a charger for an electric vehicle, the controller further disabling the charger when the time interval expires;
    wherein the controller determines a duration of said time interval from said code and sets said timer for said duration in response to said code, and said code indicates the duration for said time interval.

2. The system of claim 1 wherein said code comprises a sequence of digits.

3. The system of claim 1 wherein said code is at least partially one of encrypted, signed, and checksummed.

4. The system of claim 1 wherein at least one of the keypad, controller, and charger is associated with a parking space identification and the controller only validates said code when said code indicates the parking space identification.

5. The system of claim 1 further comprising:
a remote server, wherein said code has been provided in the transaction by the remote server to said user on one of a cell phone, PDA, or smartphone.

6. The system of claim 1 further comprising:
a pay-and-display parking kiosk having a printer, and wherein said code is printed by the kiosk.

7. A system for charging electric vehicles comprising:
a keypad for a user to enter a code, said code to have been provided to the user in a transaction that established a time interval of charging;
a controller having communication with said keypad, said controller to validate that said code is issued to represent authorization for the time interval of charging, said controller having a timer to determine an expiration of the time interval, wherein, in response to said code being validated, said controller initiates the timer and enables a charger for an electric vehicle, the controller further disabling the charger when the time interval expires;
wherein the controller determines a duration of said time interval from said code and sets said timer for said duration in response to said code, and said timer comprises a clock and said code indicates a time for said time interval to end, whereby the charger is disabled at the time indicated by the code.

8. The system of claim 7 wherein said code comprises a sequence of digits.

9. The system of claim 7 wherein said code is at least partially one of encrypted, signed, and checksummed.

10. The system of claim 7 further comprising:
a pay-and-display parking kiosk having a printer, and wherein said code is printed by the kiosk.

11. The system of claim 7 wherein at least one of the keypad, controller, and charger is associated with a parking space identification and the controller only validates said code when said code indicates the parking space identification.

12. The system of claim 7 further comprising:
a remote server, wherein said code has been provided in the transaction by the remote server to said user on one of a cell phone, PDA, or smartphone.

13. A system for charging electric vehicles comprising:
a keypad for a user to enter a code, said code to have been provided to the user in a transaction that established a time interval of charging;
a controller having communication with said keypad, said controller to validate that said code is issued to represent authorization for the time interval of charging, said controller having a timer to determine an expiration of the time interval, wherein, in response to said code being validated, said controller initiates the timer and enables a charger for an electric vehicle, the controller further disabling the charger when the time interval expires;
a pay-and-display parking kiosk having a printer, and wherein said code is printed by the kiosk.

14. The system of claim 13 wherein the controller determines a duration of said time interval from said code and sets said timer for said duration in response to said code, and said code indicates the duration for said time interval.

15. The system of claim 13 wherein the controller determines a duration of said time interval from said code and sets said timer for said duration in response to said code, said timer comprises a clock, and said code indicates a time for said time interval to end, whereby the charger is disabled at the time indicated by the code.

16. The system of claim 13 wherein said code comprises a sequence of digits.

17. The system of claim 13 wherein said code is at least partially one of encrypted, signed, and checksummed.

18. The system of claim 13 wherein at least one of the keypad, controller, and charger is associated with a parking space identification and the controller only validates said code when said code indicates the parking space identification.

19. The system of claim 13 further comprising:
a remote server, wherein said code has been provided in the transaction by the remote server to said user on one of a cell phone, PDA, or smartphone.

* * * * *